(12) United States Patent
Schell

(10) Patent No.: US 6,593,671 B1
(45) Date of Patent: Jul. 15, 2003

(54) PROCESS AND APPARATUS FOR SUPPLYING ELECTRIC ENERGY TO THE WIRING OF A MOTOR VEHICLE

(75) Inventor: Andreas Schell, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/617,314

(22) Filed: Jul. 14, 2000

(30) Foreign Application Priority Data

Jul. 14, 1999 (DE) .......................................... 199 32 781

(51) Int. Cl.$^7$ ................................................ H02J 1/00
(52) U.S. Cl. .............................. 307/87; 307/66; 307/80; 307/81; 307/64; 307/9.1; 307/10.1; 180/60; 180/65.3; 429/13
(58) Field of Search .............................. 307/87, 66, 80, 307/81, 64, 9.1, 10.1; 180/60, 65.3; 429/13

(56) References Cited

U.S. PATENT DOCUMENTS 3,443,115 A * 5/1969 Timmerman ................. 307/66
4,489,242 A   12/1984 Worst
5,780,980 A   7/1998 Naito
5,808,448 A * 9/1998 Naito ........................... 322/13
6,158,537 A * 12/2000 Nonobe ..................... 180/65.3

FOREIGN PATENT DOCUMENTS

| DE | 195 23 109 A1 | 1/1997 |
| DE | 19523109 | 1/1997 |
| DE | 19703171 | 8/1998 |
| DE | 197 03 171 A1 | 8/1998 |
| JP | 09231991 | 9/1997 |
| JP | 10271706 | 10/1998 |

* cited by examiner

Primary Examiner—Brian Sircus
Assistant Examiner—Robert L. Deberadinis
(74) Attorney, Agent, or Firm—Crowell & Moring LLP

(57) ABSTRACT

Process for electrically energizing a motor vehicle wiring circuit which has a battery, at least one electric consuming device and a fuel cell unit connected therein. The fuel cell unit is activated when the battery voltage falls below a preadjustable battery voltage limit, and when the wiring load exceeds a preadjustable vehicle wiring load; and is deactivated when the battery voltage exceeds a preadjustable battery voltage limit.

7 Claims, 1 Drawing Sheet

PROCESS AND APPARATUS FOR SUPPLYING ELECTRIC ENERGY TO THE WIRING OF A MOTOR VEHICLE

BACKGROUND AND SUMMARY OF THE INVENTION

This application claims the priority of German patent document 199 32 781.5, filed Jul. 14, 1999, the disclosure of which is expressly incorporated by reference herein.

The present invention relates to a process and apparatus for supplying electric energy to the wiring of a motor vehicle.

German Patent Document DE 197 03 171 A1 discloses a vehicle with a driving internal-combustion engine and an energy source assigned to the latter, as well as electric consuming devices. The consuming devices are supplied with electric energy by a current generating device in the form of a fuel cell unit which can be activated independently of the operation of the internal-combustion engine. Parallel to the consuming devices, which can be energized by the fuel cell unit, a buffer battery is provided for covering short-term demand peaks, such as occur, for example, when starting the internal-combustion engine.

In German Patent Document DE 195 23 109, a motor vehicle driven by an internal-combustion has a fuel cell system for generating electric energy for operating electric consuming devices, instead of a generator. The electric energy for starting the fuel cell system (or a splitting system assigned to the latter) is provided by a battery. In this case, it can be provided that a voltage regulator adapts the output voltage supplied by the fuel cells for supplying consuming devices with electric energy according to the requirements. The provision of such a voltage regulator between the fuel cell system and the vehicle wiring was found to require relatively high expenditures.

It is an object of the invention to provide a process and apparatus for electrically energizing a vehicle wiring system, using a fuel cell system for generating current, in a particularly simple manner.

This and other objects and advantages are achieved by the circuit arrangement according to the invention, in which an electronic power system for adapting the voltage between the fuel cell system and the vehicle wiring is unnecessary. Because of an electric interaction between the individual current generating components for the vehicle wiring, higher efficiency of the overall system is obtained. In addition, the overall system can be provided at a lower cost in comparison to conventional solutions.

According to the invention, a low-cost, optimal adaptation of the fuel cell system is provided to a changeable current demand of the vehicle wiring. The battery can be charged by the fuel cell, simultaneously with or independently of a supply of the vehicle wiring with energy. The process according to the invention, makes it possible to operate the fuel cell unit constantly at nominal capacity because a generated current can optionally be supplied to the battery and/or a consuming device.

The fuel cell unit is activated when the battery voltage falls below a preadjustable limit for charging the battery and optionally for at least partially supplying the vehicle wiring with electric energy. This measure ensures optimal utilization of the energy provided by the respective current supply components. This measure can e used with particular advantage when the vehicle engine is switched off.

In addition, the fuel cell unit can be activated when the vehicle wiring load exceeds a preadjustable limit. As a result, it is possible, for example, to design a battery, and even an existing generator, to be relatively small in comparison to conventional arrangements because, when a defined vehicle wiring load is exceeded, the fuel cell unit can take over the load to a maximum possible power output. Furthermore, the fuel cell unit is deactivated when a preadjustable battery voltage limit is exceeded. As a result, the battery can be protected from damage due to overcharging.

According to a particularly preferred embodiment, the circuit arrangement according to the invention has a diode which is connected between the battery and the fuel cell unit. As a result, current flow in only on direction between the fuel cell unit and the battery or the vehicle wiring is ensured in a simple manner.

Other objects, advantages and novel features of the present invention will become apparent from the following detailed description of the invention when considered in conjunction with the accompanying drawings.

DETAILED DESCRIPTION OF THE DRAWINGS

For the purpose of the following description, it will be assumed that a fuel cell having the reference number 1 is to be active independently of the engine. That is, the engine of the vehicle is switched off from time to time, and, in this condition, the driver switches on an arbitrary consuming device 2.

Figure 1:
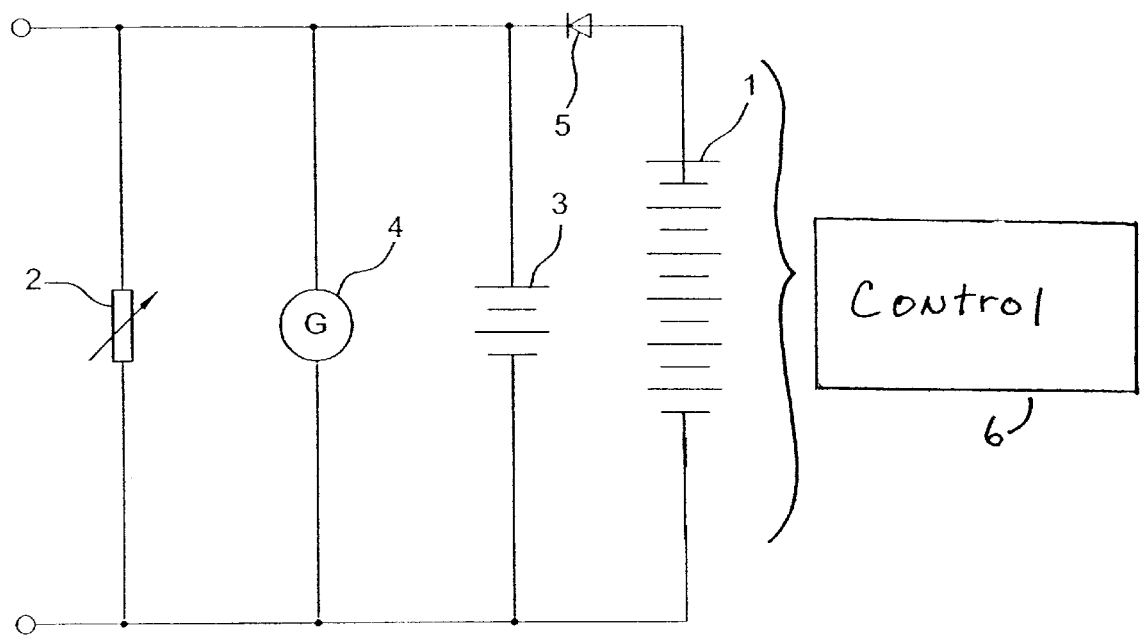
FIG. 1 is a view of a preferred embodiment of the circuit arrangement according to the invention.

As illustrated in FIG. 1, a motor vehicle battery 3 and a generator 4 are connected parallel to the fuel cell unit 1. In the described condition (engine switched off), the generator 4 is not used because it is normally driven mechanically by the engine. (A corresponding operating mode also occurs when no generator exists.)

When the driver switches on the consuming device 2, the voltage of the motor vehicle battery 3 will be reduced with an increasing discharge; and when it falls below an adjusted voltage limit, the fuel cell unit 1 is activated by a control unit 6, to supply electric power.

The fuel cell unit 1 is electrically softly coupled with the is vehicle wiring by a diode. When the fuel cell unit is switched on, it builds up its voltage an takes over the load to a maximum possible power output, only when the actual battery voltage is exceeded. If the load of the switched-on consuming device 2 is lower than the maximum possible fuel cell unit output power, the battery 3 is recharged simultaneously with the supply of power to the consuming device 2. (Such recharging of the battery 3 will also be possible when the consuming device 2 is switched off.)

Figure 2:
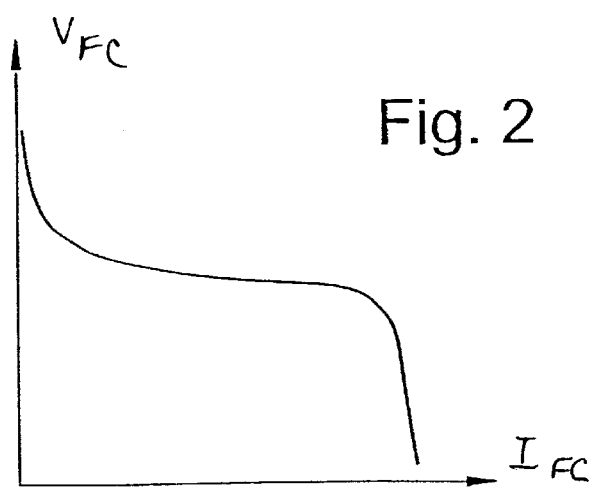
FIG. 2 is a view of the characteristic current voltage curve of a fuel cell when used for charging a battery.

Charging of the battery 3 by the fuel cell unit 1 takes place according to the characteristic current voltage curve of the fuel cell unit illustrated in FIG. 2, in which at first a relatively large charging current $I_{FC}$ occurs at a relatively low charging voltage $V_{FC}$. However, toward the end of the charging of the battery, the voltage $V_{FC}$ rises because of the higher internal resistance, and the current $I_{FC}$ supplied by the fuel cell unit decreases. To protect the battery from damage by overcharging, the fuel cell unit is switched off by the control unit 6 when an upper voltage limit has been reached.

Because of the supply according to the invention of a consuming device by way of th battery 3 and/or the fuel cell unit 1, with the possibility of simultaneously charging the battery 3 by means of the fuel cell unit 1, it is unnecessary to know precisely the current consumption demand of the consuming device. The system described according to the invention can react in a simple and low-expenditure manner to unknown or variable current demands without need for regulating the power of the fuel cell unit 1 (for example, by controlling the hydrogen or the air flow rate). An electronic power system for controlling the fuel cell unit for a voltage adaptation is therefore not necessary.

Preferred dimensions of the illustrated circuit arrangement will be indicated in the following as examples: The vehicle wiring may particularly be a utility vehicle wiring with a voltage of from 17 to 28 volt. The battery 3 and the generator 4 may be designed for a 24 volt operation. Assuming an idling voltage of the individual cells of the fuel assembly 1 of 1.06 volts and a corresponding full-load voltage of 0.6 volt, in the case of 45 cells for the fuel cell unit, a full-load voltage $V_{FC(full\ load)}$ of 27 and an idling voltage $V_{FC(idling)}$ of 48 volts are obtained.

It should be pointed out again that engine-independent operation of the fuel cell unit 1, which is illustrated as an example, is analogously possible when the engine is running, that is with the generator 4 operating. The circuit arrangement according to the invention make s it possible for the fuel cell unit 1 optimally to supplement the battery—generator system, also when the engine is running.

Another criterion for the connection of the fuel cell unit 1 is the required vehicle wiring load; particularly if, for reasons of cost, the battery 3 or the generator 4 is not designed for maximal vehicle wiring load. In this case, the fuel cell unit 1 is activated when a preadjustable vehicle wiring load is exceeded. Advantageously, this preadjustable vehicle wiring load corresponds to the maximum vehicle wiring load in the case of the actual battery voltage. However, it is also possible to define the preadjustable vehicle wiring load independently of the momentary battery voltage. The connection of the fuel cell unit 1 when a preadjustable vehicle wiring load is exceeded avoids rapid discharging of the battery 3 or ensures a sufficient voltage supply, even at a maximum vehicle wiring load.

The two connecting criteria—preadjustable battery voltage and preadjustable vehicle wiring load—can of course be combined arbitrarily. Furthermore, it is apparent that, if a generator 4 is present, it can also contribute to charging the battery 3, and that correspondingly suitable measures must be taken to protect the battery 3 against overcharging.

The foregoing disclosure has been set forth merely to illustrate the invention and is not intended to be limiting. Since modifications of the disclosed embodiments incorporating the spirit and substance of th invention may occur to persons skilled in the art, the invention should be construed to include everything within the scope of the appended claims and equivalents thereof.

What is claimed is:

1. A process for electrically energizing a wiring circuit of a motor vehicle having at least one electric consuming device, a battery, and a fuel cell unit arranged parallel to the battery, the fuel cell unit being used at least temporarily for supplying the vehicle wiring with electric energy or for charging the battery, said process comprising:

activating the fuel cell unit when the battery voltage falls below a first preadjustable battery voltage limit;

activating the fuel cell unit when a vehicle wiring load exceeds a preadjustable level; and deactivating the fuel cell when the battery voltage exceeds a second preadjustable battery voltage limit.

2. Process according to claim 1, wherein the first preadjustable vehicle wiring load corresponds to a maximal vehicle wiring load at actual battery voltage.

3. Process according to claim 1, wherein the fuel cell unit can also be activated when th e engine of the motor vehicle is switched off.

4. Process according to claim 1, wherein after activation, the fuel cell unit is operate at a constant load.

5. Apparatus for electrically energizing a motor vehicle wiring circuit having a variable load connected therein, said apparatus comprising:

a battery connected with said load in said wiring circuit;

a fuel cell connected in parallel with said battery; and a control unit program med to activate the fuel cell when a voltage output of the battery is less than a first preadjustable battery voltage limit, to activate the fuel cell also when said variable load exceeds a preadjustable level, and to deactivate the fuel cell w en the battery voltage exceeds a second preadjustable battery voltage limit.

6. Apparatus according to claim 5, further comprising a generator connected to said battery and said load, in parallel with said fuel cell.

7. The apparatus according to claim 5, further comprising a diode connected between said battery and said fuel cell.

\* \* \* \* \*